Figure 1:
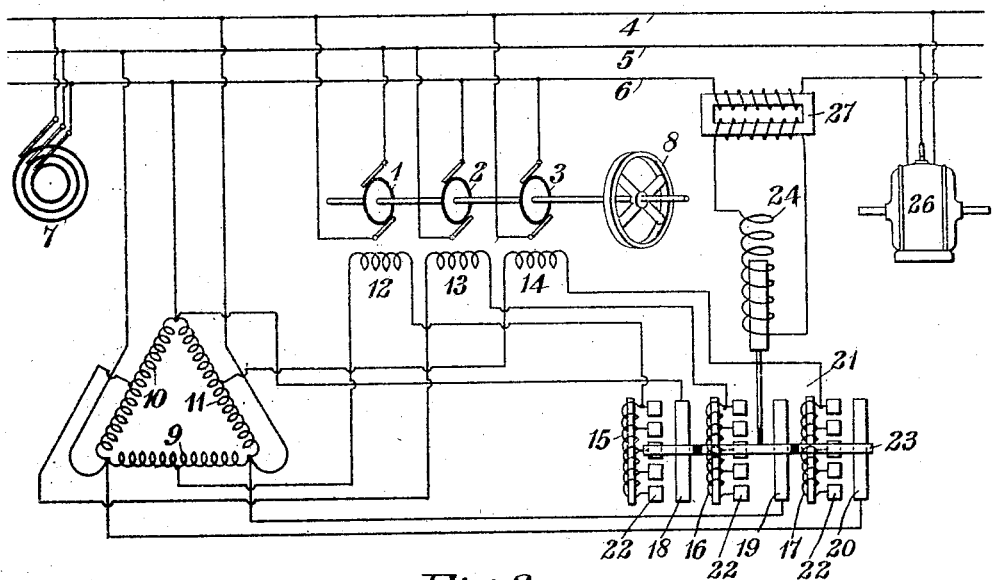

B. G. LAMME.
ELECTRICAL EQUALIZING SYSTEM.
APPLICATION FILED SEPT. 3, 1907.

924,799

Patented June 15, 1909.

WITNESSES:
C. L. Belcher
Otto S. Schairer

INVENTOR
Benjamin G. Lamme
BY
ATTORNEY

B. G. LAMME.
ELECTRICAL EQUALIZING SYSTEM.
APPLICATION FILED SEPT. 3, 1907.

924,799.

Patented June 15, 1909.
2 SHEETS—SHEET 2.

WITNESSES:
C. L. Belcher
Otto S. Schairer

INVENTOR
Benjamin G. Lamme
BY
Kelley G. Carr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRICAL EQUALIZING SYSTEM.

No. 924,799.   Specification of Letters Patent.   Patented June 15, 1909.

Application filed September 3, 1907. Serial No. 391,214.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Electrical Equalizing Systems, of which the following is a specification.

My invention relates to systems of electrical distribution, and particularly to means for equalizing the load upon the generating or supply station when the load upon the system is variable.

The object of my invention is to provide simple and effective means that may be employed in connection with alternating current systems of any number of phases for absorbing or yielding energy in accordance with variations in load upon the system, in such a manner that the load upon the generating or supply station of the system may remain substantially constant or may not exceed a predetermined value.

It has heretofore been proposed to employ fly-wheels, or other devices having considerable inertia, in systems of distribution that supply translating devices requiring widely varying amounts of power, and to so drive the fly-wheels and control their operation that the load upon the distributing circuit will remain substantially constant, regardless of the variations in the amount of power required by the translating devices.

In the present system, a dynamo-electric machine, that may operate either as a motor or as a generator and to which a fly-wheel is mechanically coupled, is directly connected to the distributing circuit without the intervention of a rotary converter or other similar device, and the arrangement is such that but comparatively small and inexpensive machines need be provided and only a single equalizer set is necessary for equalizing the load provided by a plurality of translating devices.

The invention is especially adapted for use in connection with alternating current systems of distribution, and in its most useful embodiment it comprises a plurality of mechanically coupled dynamo-electric machines of the commutator type, one for each phase of the system of distribution, a fly-wheel being also coupled to the said machines. The armatures of the machines are connected, respectively, to the various phases of the distributing circuit, and the field magnet windings are connected to phases of the circuit other than those to which the corresponding armatures are connected, in order that the generated and counter-electromotive forces of the armatures may be nearly of the same phases as the electromotive forces of the circuits to which they are connected. The machines are caused to operate alternately as motors and generators, by adjusting their field strengths, or otherwise, in accordance with the variations in the load afforded by the translating devices, energy being stored in the fly-wheel when operating the machines as motors and yielded for operating the machines as generators in order to supply current to the system.

Figure 2:
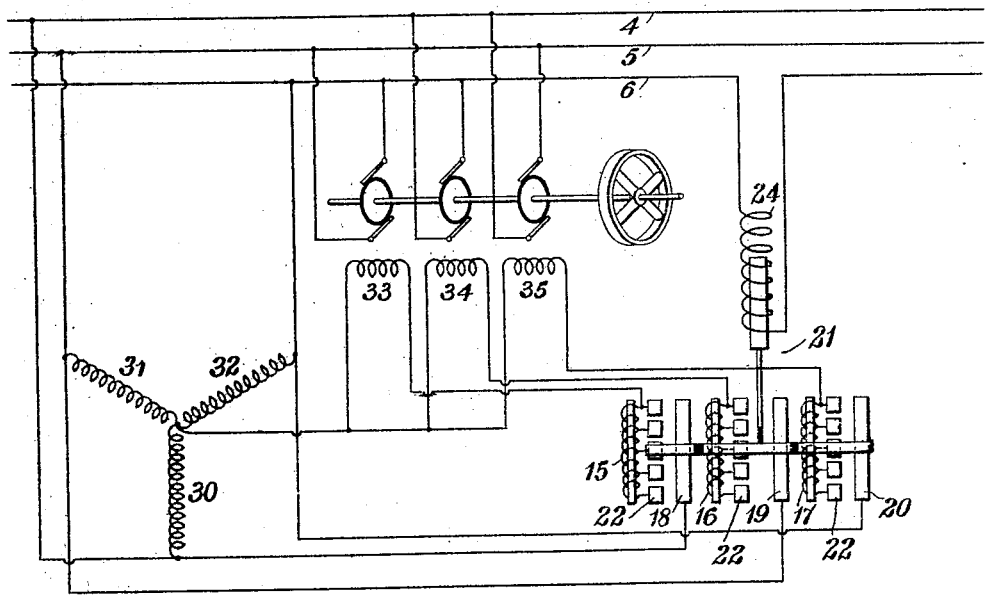
Figure 3:
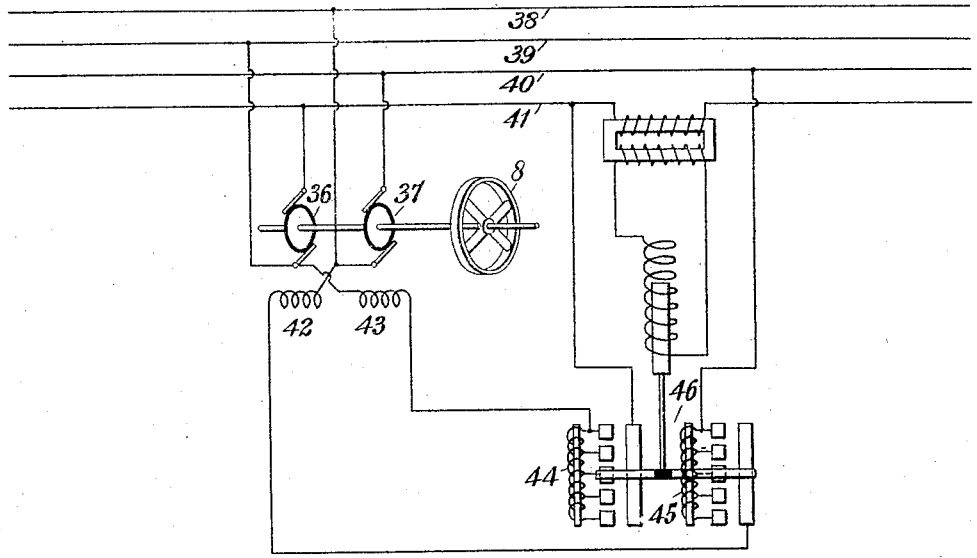
Figure 4:
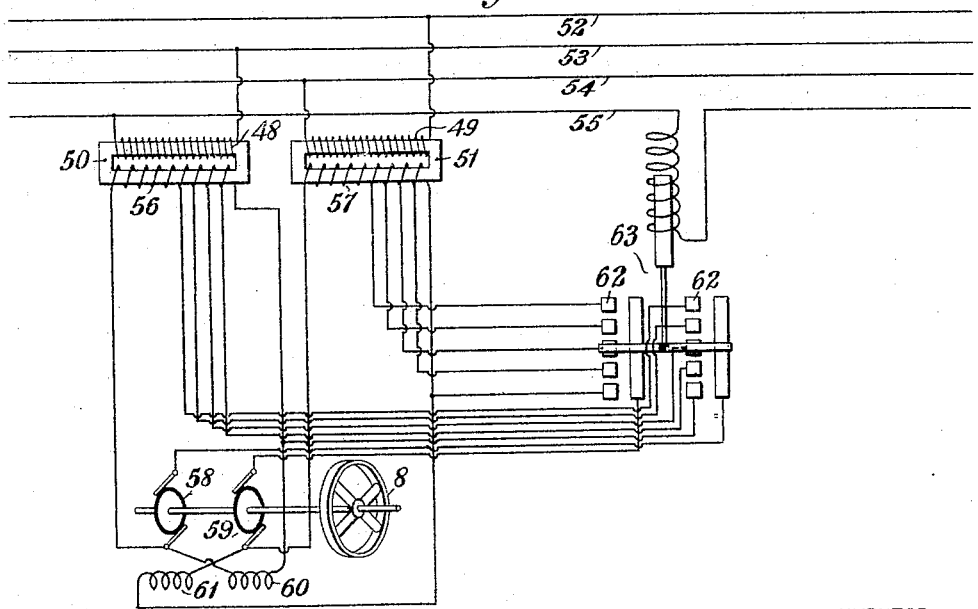

Figures 1 and 2 of the accompanying drawings are diagrammatic views of arrangements of the circuits of three-phase systems of distribution that embody my invention, and Figs. 3 and 4 are similar views of two-phase systems of distribution also embodying the invention.

In Fig. 1, mechanically coupled armatures 1, 2 and 3 of three dynamo-electric machines of the commutator type of construction are connected, respectively, between the different pairs of conductors 4, 5 and 6 of a three-phase circuit that is supplied from a generator 7, or other suitable source, the armatures being provided with large masses, or a fly-wheel 8 being coupled thereto, in order that the rotatable system may possess considerable inertia. Also connected between the different pairs of conductors of the supply circuit are three delta-connected windings 9, 10 and 11 of a three-phase transformer, to intermediate points of which terminals of field magnet windings 12, 13 and 14, respectively, of the dynamo-electric machines are connected, the remaining terminals of the field magnet windings being connected, respectively, to the extremities of three sub-divided impedance devices 15, 16 and 17, preferably of the same power factors as the field magnet windings. The vertices of the delta-connected transformer windings are connected, respectively, to conducting strips 18, 19 and 20 of a controlling device 21 that comprises further three sets of contact terminals 22 that are disposed, respectively, adjacent to the conducting strips 18, 19 and 20 and are connected to the several points of subdivision of the impedance devices 15, 16 and 17.

The conducting strips 18, 19 and 20 and the adjacent sets of stationary contact terminals are engaged and electrically connected by movable conducting blocks 23 that are actuated by an electromagnet having a winding 24 to which current is supplied proportional in amount to that required from the distributing circuit 4—5—6 by any suitable load, such as an induction motor 26. In the present instance, the magnet winding 24 is supplied with current proportional in amount to that traversing the conductor 6 by means of a series transformer 27, though it will be understood, of course, that the said winding may be connected directly in series with the conductor 6, or with any other conductor of the distributing circuit. Thus the positions of the movable blocks 23, with reference to the stationary contact terminals 22, and the amount of impedance included in circuit with the field magnet windings 12, 13 and 14, are dependent upon and are determined by the amount of current required by the load from the distributing circuit.

It will be noted that the field magnet windings are severally connected between intermediate points of the delta-connected transformer windings that are connected to the same pairs of circuit conductors as the corresponding armatures and the remaining circuit conductors. Thus, electromotive forces applied to the field magnet windings are substantially 90° out of phase, respectively, with those of the several pairs of circuit conductors to which the corresponding armatures are connected, and the counter and generated electromotive forces in the armatures therefore agree approximately in phase with the electromotive forces of the circuit conductors to which they are connected.

The impedance devices 15, 16 and 17 are employed for the purpose of regulating the field strengths of the dynamo-electric machines, and in order that the above-mentioned phase relations may not be materially disturbed in effecting such regulation, it will usually be found desirable, though not necessary, that the power factors of the said devices be substantially the same as the power factors of the field magnet windings.

If, in the operation of the system, the current required of the distributing circuit by the load 26 is less than a predetermined amount, the movable contact blocks 23 of the controller 21 will occupy positions such that considerable amounts of the impedance afforded by the devices 15, 16 and 17 will be included in circuit with the field magnet windings. The field magnet strengths will be thereby so reduced that the counter electromotive forces in the armatures will become less than the electromotive forces of the conductors to which the armatures are connected, and the machines will, therefore, be caused to operate as motors so as to store energy in the fly-wheel 8. If the load increases, the amounts of impedance included in the field circuits will be decreased and the field strengths will be correspondingly increased. The energy previously stored in the rotatable system, including the fly-wheel, is then yielded to operate the machines as generators of greater electromotive forces than the electromotive forces of the circuit conductors to which the armatures are connected. Thus, by adjusting the field strengths of the machines in accordance with variations in the amount of current required of the distributing circuit, the machines are caused to operate as motors when the said current is less than a predetermined amount and as generators when the said current is greater than the predetermined amount.

In the system of Fig. 2, the three windings 30, 31 and 32 of a three-phase transformer are connected together in star or Y arrangement and to the distributing circuit 4—5—6, in the usual manner, one terminal of each of field magnet windings 33, 34 and 35 of the dynamo-electric machines, that are adapted to operate either as motors or as generators, being connected to the neutral point or the common connection of the transformer windings, and the other terminals being connected, respectively, to the extremities of the subdivided impedance devices 15, 16 and 17. The outer extremities of the transformer windings 30, 31 and 32 are connected, respectively, to the stationary conducting strips 18, 19 and 20 of the controlling device 21, the remainder of the system being substantially like that of Fig. 1. It will be noted that each field magnet winding is supplied from one leg or winding of the three-phase transformer, while the extremities of the other two legs or windings of the transformer are connected to the same circuit conductors as the corresponding armature, and that, consequently, the electromotive forces applied to the field magnet windings are approximately 90° out of phase with those of the circuit conductors to which the corresponding armatures are connected. The operation of the system is similar in all respects to that of Fig. 1.

In a two-phase system, electromotive forces may be applied to the field magnet windings substantially 90° out of phase with those of the circuit conductors to which the armatures are connected, by connecting the field magnet windings to different phases of the distributing circuit than those to which the armatures are connected. Such a system is shown in Fig. 3, in which armatures 36 and 37 of two mechanically coupled dynamo-electric machines are connected, respectively, to different pairs of conductors of a two-phase distributing circuit 38—39—40—41, and field magnet windings 42 and 43 of the machine are supplied from other pairs of the circuit conductors than those to which the corresponding armatures are connected. As in the systems of Figs. 1 and 2, impedance devices 44 and 45 are included in circuit with the field magnet windings, and the amounts of impedance are adjusted, as before, by means of a controller 46 that is actuated in response to variations in the amount of current required of the distributing circuit.

In the above described systems, the dynamo-electric machines have been caused to operate either as motors or generators by adjusting the field strengths thereof so as to cause the counter or general electromotive forces to be less than or exceed the electromotive forces of the circuit conductors to which the armatures are connected, but the same result may be effected by adjusting the voltages of the circuits to which the armatures are connected so as to cause them to exceed or be less than the counter or generated electromotive forces of the machines. This is accomplished in the system of Fig. 4, in which primary windings 48 and 49 of two transformers 50 and 51 are connected between different pairs of conductors of a two-phase distributing circuit 52—53—54—55, the said transformers having subdivided secondary windings 56 and 57 from which armatures 58 and 59 and field magnet windings 60 and 61 of two mechanically coupled dynamo-electric machines are, respectively, supplied. The several points of subdivision of the secondary windings 56 and 57 are connected to two sets of stationary contact terminals 62 of a controlling device 63 that is constructed and operated in a manner similar to the controllers of Figs. 1, 2 and 3. The controlling device is adapted to connect one terminal of each of the armatures 58 and 59 to suitable points in the secondary windings 56 and 57 in order to adjust the voltages of the circuits to which the armatures are connected and to cause the said voltages to be greater or less than the counter or generated electromotive forces of the said machines. Thus, when the current required of the distributing circuit is less than the predetermined amount, the armatures are connected between high voltage points of the transformer windings 56 and 57, and the machines are caused to operate as motors and to store energy in the fly-wheel 8 and in the remainder of the rotatable system, which energy is used to operate the machines as generators when the current required of the distributing circuit is greater than a predetermined amount and the armatures are connected to low-voltage points of the transformer windings 56 and 57.

I claim as my invention:

1. The combination with a polyphase alternating current distributing circuit, and a plurality of mechanically coupled dynamo-electric machines having their armatures associated, respectively, with the differently phased electromotive forces thereof, of means for deriving from the distributing circuit and applying to the field magnet windings electromotive forces that differ in phase, respectively, from those of the said circuit with which the corresponding armatures are associated, and means for adjusting the field strengths of the said machines to cause them to operate as motors when the current required from the distributing circuit is less than a predetermined amount and to operate as generators when the said current is greater than the predetermined amount.

2. The combination with a polyphase alternating current distributing circuit and a plurality of dynamo-electric machines mechanically coupled together and to parts possessing considerable inertia and having their armatures associated, respectively, with different pairs of conductors of said circuit, of three delta-connected transformer windings connected to the distributing circuit, the field magnet windings of the machines being supplied with currents derived from circuits extending between intermediate points of the transformer windings that are connected to the same circuit conductors as those with which the corresponding armatures are associated and the connections between the other two transformer windings.

3. The combination with a polyphase alternating current distributing circuit and a plurality of mechanically coupled dynamo-electric machines having their armatures associated, respectively, with different pairs of conductors thereof, of three delta-connected transformer windings connected to the distributing circuit, the field magnet windings of the machines being supplied with currents derived from circuits extending between intermediate points of the transformer windings that are connected to the same circuit conductors as those with which the corresponding armatures are associated and the connections between the other two transformer windings, and means for adjusting the field strengths of the machines to cause them to operate as motors when the current required from the distributing circuit is less than a predetermined amount and to operate as generators when the said current exceeds the predetermined amount.

4. The combination with a polyphase alternating current distributing circuit, and a plurality of mechanically coupled dynamo-electric machines having their armatures associated, respectively, with the differently phased electromotive forces thereof, of means for deriving from the distributing circuit and applying to the field magnet windings electromotive forces that differ in phase, respectively, from those of the said circuit with which the corresponding armatures are associated, and means for effecting adjustment of the ratio of the respective electromotive forces of the said circuit and of the said armatures.

5. The combination with a polyphase alternating current distributing circuit, and a plurality of mechanically coupled dynamo-electric machines having their armatures associated, respectively, with different pairs of conductors thereof, of a polyphase transformer connected to the distributing circuit and from which the field magnet windings of the machines are supplied, and means for adjusting the field strengths of the machines to cause them to operate as motors or generators according as the current required of the distributing circuit is less than or exceeds a predetermined amount.

In testimony whereof, I have hereunto subscribed my name this 28th day of August, 1907.

BENJ. G. LAMME.

Witnesses:
OTTO S. SCHAIRER,
BIRNEY HINES.